(12) United States Patent
Pestana et al.

(10) Patent No.: US 10,360,133 B2
(45) Date of Patent: Jul. 23, 2019

(54) ANALYZING ANALYTIC ELEMENT NETWORK TRAFFIC

(71) Applicant: ObservePoint Inc., Provo, UT (US)

(72) Inventors: John Raymond Pestana, Orem, UT (US); Robert K. Seolas, Alpine, UT (US); Tyler Broadbent, Lehi, UT (US); Dan Reno, Orem, UT (US); Gregory Larson, Orem, UT (US)

(73) Assignee: ObservePoint Inc., Provo, UT (US)

( * ) Notice: Subject to any disclaimer, the term of this patent is extended or adjusted under 35 U.S.C. 154(b) by 134 days.

(21) Appl. No.: 15/502,864

(22) PCT Filed: Feb. 3, 2017

(86) PCT No.: PCT/US2017/016553
§ 371 (c)(1),
(2) Date: Feb. 9, 2017

(87) PCT Pub. No.: WO2017/136755
PCT Pub. Date: Aug. 10, 2017

(65) Prior Publication Data
US 2018/0329799 A1   Nov. 15, 2018

Related U.S. Application Data

(60) Provisional application No. 62/291,215, filed on Feb. 4, 2016.

(51) Int. Cl.
*G06F 11/00* (2006.01)
*G06F 11/36* (2006.01)
(Continued)

(52) U.S. Cl.
CPC .......... *G06F 11/3612* (2013.01); *G06F 11/34* (2013.01); *G06F 11/36* (2013.01);
(Continued)

(58) Field of Classification Search
CPC .............. G06F 11/3612; G06F 11/362; G06F 11/3692; G06F 17/30876; H04L 67/02;
(Continued)

(56) References Cited

U.S. PATENT DOCUMENTS 6,470,383 B1   10/2002   Leshem et al.
7,502,994 B2 *  3/2009   Kocol ................ G06Q 30/0257
                                                        705/14.55
(Continued)

FOREIGN PATENT DOCUMENTS

CA         2992605 A1 * 12/2016 .......... G06F 11/3664
KR    1020150079867        7/2015
(Continued)

OTHER PUBLICATIONS

Final Office Action for U.S. Appl. No. 14/917,251 dated May 10, 2019 (Year: 2019).*

(Continued)

*Primary Examiner* — Michael Maskulinski
(74) *Attorney, Agent, or Firm* — Workman Nydegger (57) ABSTRACT

Disclosed embodiments include a computer system for verifying proper configuration of analytic elements. The computer system identifies an analytic element associated with a network-connected software application. The computer system also executes the analytic element such that the analytic element initiates a network communication with a remote server. The computer system then searches a dataset for information relating to the network communication from the analytic element. The dataset comprises network communications received by a remote server. When the network communication generated by the analytic element is not found within the dataset, the computer system generates a report that the analytic element is not functioning properly.

18 Claims, 5 Drawing Sheets

(51) Int. Cl.
*G06F 16/245* (2019.01)
*H04L 12/24* (2006.01)
*G06F 11/34* (2006.01)
*H04L 29/08* (2006.01)

(52) U.S. Cl.
CPC ...... *G06F 11/3668* (2013.01); *G06F 11/3692* (2013.01); *G06F 16/245* (2019.01); *H04L 41/08* (2013.01); *G06F 2201/875* (2013.01); *H04L 67/02* (2013.01)

(58) Field of Classification Search
CPC . H04L 67/22; G06Q 30/0201; G06Q 30/0277
See application file for complete search history.

(56) References Cited

U.S. PATENT DOCUMENTS

| | | | |
|---|---|---|---|
| 8,239,820 B1 | 8/2012 | White et al. | |
| 8,955,149 B1 | 2/2015 | Baer et al. | |
| 9,357,366 B2 * | 5/2016 | Seolas | H04L 43/045 |
| 9,690,764 B1 | 6/2017 | Batni | |
| 9,842,133 B2 * | 12/2017 | Seolas | G06F 17/30371 |
| 2003/0217191 A1 | 11/2003 | Gao | |
| 2006/0107306 A1 | 5/2006 | Thirumalai et al. | |
| 2006/0167717 A1 | 7/2006 | Desenberg | |
| 2007/0239726 A1 | 10/2007 | Weiss et al. | |
| 2008/0104542 A1 | 5/2008 | Cohen et al. | |
| 2009/0150262 A1 | 6/2009 | Mizhen | |
| 2009/0327858 A1 | 12/2009 | Tsun | |
| 2010/0017880 A1 | 1/2010 | Masood | |
| 2010/0138437 A1 | 6/2010 | Nadig et al. | |
| 2011/0035486 A1 * | 2/2011 | Seolas | G06F 11/362 709/224 |
| 2011/0153796 A1 * | 6/2011 | Branson | G06F 17/30887 709/223 |
| 2011/0161922 A1 | 6/2011 | Gerken | |
| 2011/0185016 A1 | 7/2011 | Kandasamy et al. | |
| 2011/0302510 A1 | 12/2011 | Harrison | |
| 2012/0059706 A1 | 3/2012 | Goenka | |
| 2012/0066583 A1 | 3/2012 | Priestley | |
| 2013/0066724 A1 | 3/2013 | Evans | |
| 2013/0145349 A1 | 6/2013 | Basak | |
| 2013/0174047 A1 | 7/2013 | Sivakumar et al. | |
| 2013/0332277 A1 | 12/2013 | Faith | |
| 2013/0337789 A1 | 12/2013 | Johnson | |
| 2013/0346851 A1 | 12/2013 | Leece | |
| 2014/0129540 A1 | 5/2014 | Riley et al. | |
| 2014/0164350 A1 | 6/2014 | Landa et al. | |
| 2014/0195510 A1 | 7/2014 | Jourdan | |
| 2014/0280012 A1 * | 9/2014 | Feuerlein | G06Q 30/00 707/709 |
| 2014/0297836 A1 | 10/2014 | Cohen | |
| 2014/0330835 A1 | 11/2014 | Boyer | |
| 2015/0026201 A1 | 1/2015 | Mukherjee et al. | |
| 2015/0067839 A1 | 3/2015 | Wardman | |
| 2015/0134685 A1 | 5/2015 | Satishkumar | |
| 2015/0135061 A1 | 5/2015 | Palanichamy | |
| 2016/0048602 A1 * | 2/2016 | Yastrebenetsky | G06F 17/30864 715/234 |
| 2016/0086215 A1 | 3/2016 | Wang | |
| 2016/0132048 A1 | 5/2016 | Kambe et al. | |
| 2016/0188552 A1 | 6/2016 | Wang | |
| 2016/0253679 A1 | 9/2016 | Venkatraman | |
| 2016/0259717 A1 | 9/2016 | Nychis | |
| 2017/0103058 A1 | 4/2017 | Gandhi | |
| 2017/0255445 A1 | 9/2017 | Seolas | |
| 2017/0255475 A1 | 9/2017 | Seolas | |
| 2018/0137351 A1 | 5/2018 | Hopen | |
| 2018/0139222 A1 | 5/2018 | Wan | |

FOREIGN PATENT DOCUMENTS

| | | |
|---|---|---|
| WO | 2004079551 | 9/2004 |
| WO | 2017078705 | 5/2017 |
| WO | 2017136755 | 8/2017 |
| WO | 2017138926 | 8/2017 |

OTHER PUBLICATIONS

International Search Report and Written Opinion for application No. PCT/US2017/016553 dated Jun. 5, 2017.
International Search Report and Written Opinion for application No. PCT/US2016/017194 dated Nov. 1, 2016.
Non-Final Office Action for U.S. Appl. No. 14/914,590 dated Jul. 25, 2018.
International Search Report for application No. PCT/US2015/059064 dated Aug. 4, 2016.
Non-Final Office Action for U.S. Appl. No. 14/917,251 dated Oct. 3, 2018.
Notice of Allowance for U.S. Appl. No. 14/914,590 dated Nov. 13, 2018.

* cited by examiner

ANALYZING ANALYTIC ELEMENT NETWORK TRAFFIC

CROSS-REFERENCE TO RELATED APPLICATIONS

The present invention is a 35 U.S.C. § 371 U.S. National Stage of PCT Application No. PCT/US17/16553, filed on Feb. 3, 2017, which claims priority to U.S. Provisional Application No. 62/291,215, filed on Feb. 4, 2016, the entire content of which is incorporated herein by reference.

BACKGROUND OF THE INVENTION

Technical Field

Embodiments of the present invention relate to network communication analysis.

Background and Relevant Art

As the Internet and the accompanying Internet commerce have expanded, various website owners have sought to track data about individuals who visit their websites and/or use their applications (in particular within the mobile application space). Website owners often wish to gather a variety of different analytic data about the visitors who view their webpage or use their applications. In many cases, this analytic data can be used to determine things such as what advertisements to display to a visitor and what fees should be paid to various external advertisers.

One conventional method for generating analytic data on website visitors is through the use of analytic elements (e.g., "tags"). As used herein, an "analytic element" comprises a network request initiated by a client based upon content that is delivered to the client. Oftentimes, the analytic element can provide a system for tracking users of a network-connected software application. As used herein, a "network-connected software application" comprises any application that accesses resources over a local or wide-area network, such as an internet browser.

In at least one conventional form, such as when used in context of an internet web browser, a tag is a hidden element within a webpage that causes some action to occur on a webpage when it is fired. For example, in at least one embodiment, an analytic element is a piece of code that is placed within a webpage and allows a webpage owner to track information about the visitors who download and execute the particular piece of code. For example, an analytic element can comprise a tag such as a transparent GIF or a tracking pixel, which is placed within the code of a webpage. The actual transparent GIF or tracking pixel is stored on a separate server from the actual webpage. The tag is fired when the browser requests the transparent GIF or tracking pixel from the separate server. When the separate server receives the request from the browser, the server gathers various analytic data about the requestor.

Similar methods can also be used within applications to generate analytic data on the application users. For example, many applications, especially mobile applications, request data (e.g., via html code) from remote servers and display content within the application based upon the received data. The displayed content may take the form of in-game advertisements, video content, music content, and other similar content. Similar to the analytic elements described above in webpages, analytic elements can be executed within an application that allows a server to gather various analytic data about the application user.

Once executed, an analytic element gathers information such as the visitor's origination (e.g., the referring application, webpage, or search engine), what keywords were used to find the webpage, whether a particular advertisement directed a visitor to the page, and other related data. In many situations, a single webpage comprises multiple analytic elements from a variety of different parties. For example, a particular webpage may contain a GOOGLE Analytics tag, a FACEBOOK tag, a page-counter Tag, a weather tag, and other similar analytic elements.

Properly and efficiently tracking large websites with thousands to millions of unique analytic elements and applications with similarly large collections of analytic elements can be a tremendously challenging undertaking. In particular, verifying that the proper analytic elements are embedded within each digital asset and that they are properly functioning is a problem of significant scope. Accordingly, there are a number of problems in the art relating to the creation of rules for a tag management system that can be addressed.

BRIEF SUMMARY OF THE INVENTION

Embodiments disclosed herein comprise a computer system for verifying proper configuration of analytic elements. The computer system comprises one or more processors and one or more storage devices having stored thereon computer-executable instructions that when executed by the one or more processors configure the computer system to perform various actions. For example, the computer system identifies an analytic element associated with a network-connected software application. The analytic element comprises a network request initiated by the computer system based upon content that is delivered to the computer system. The system then identifies one or more attributes associated with the analytic element. At least one of the identified attributes comprises a destination of the network request associated with the analytic element. The system receives, at the computer system, a dataset of information for network-based analytic elements. The dataset comprises information received by the destination of the network request associated with the analytic element. The system then searches the dataset for information relating to the one or more attributes associated with the analytic element. The one or more attributes uniquely identify the analytic element. When the one or more attributes associated with the analytic element are not found within the dataset, the system generates a report that the analytic element is not functioning properly.

Disclosed embodiments also comprise methods performed at a computer system for verifying proper configuration of analytic elements. The method includes identifying an analytic element associated with a network-connected software application. The analytic element comprises a network request initiated by the computer system based upon content that is delivered to the computer system. The method also includes identifying one or more attributes associated with the analytic element. The one or more attributes uniquely identify the analytic element. The method further includes searching a dataset for information relating to the one or more attributes associated with the analytic element. The dataset comprises network communications received by a remote server. When the one or more attributes associated with the analytic element are not found within the dataset, the method includes generating a report that the analytic element is not functioning properly.

Disclosed embodiments further include a computer system for verifying proper configuration of analytic elements. The computer system identifies an analytic element associated with a network-connected software application. The computer system also executes the analytic element such that the analytic element initiates a network communication with a remote server. The computer system then searches a dataset for information relating to the network communication from the analytic element. The dataset comprises network communications received by a remote server. When the network communication generated by the analytic element is not found within the dataset, the computer system generates a report that the analytic element is not functioning properly.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The embodiments disclosed herein significantly increase the reliability of network analytic information. In particular, disclosed embodiments are capable of analyzing analytic elements, in the form of executed software and source code, to identify errors in both the original execution of the analytic elements and in the resulting behaviors. For example, in some cases, a client-side simulation and analysis of a network-connected software application may indicate that all analytic elements are properly firing and functioning. A review of the actual data being received by an external analytics server, however, may indicate that the server is either not properly logging a broken analytic element or some other error is occurring that is preventing the broken analytic element from being properly logged. As used herein, a "broken analytic element" comprises an analytic element that was identified by the simulation of the network-connected software application but was not correctly logged by the remote analytics server. Upon identifying a broken analytic element, embodiments of the present invention generate a report notifying a system administrator of the error.

Additionally, in at least one embodiment, the report comprises information indicating the configuration of the broken analytic element within the network-connected software application and any information of interest that was found within the dataset of information from the remote analytic server. For example, embodiments of the present invention identify other analytic elements that are associated with the broken analytic element. For instance, a network-connected software application may comprise a software application that receives data over a local or wide-area network, such as a web browser that is executing HTML code. The HTML code may comprise analytic elements in the form of HTML tags. Further, an individual HTML webpage may comprise multiple tags. At least one disclosed embodiment provides information about other tags that were detected on the same webpage as the broken analytic element. A system administrator utilizes this information to determine if there are any errors with the other identified tags and based upon that determination attempts to correct any issues with the broken analytic element.

Accordingly, disclosed embodiments provide significant technical advancements within the field of analyzing analytic element network traffic. For example, disclosed embodiments intelligently scan source code and application behavior to identify attributes associated with various different analytic elements. Disclosed embodiments then search a dataset of information for the identified attributes to determine if data associated with each analytic element was properly captured. Based upon the analysis, disclosed embodiments provide an end-user with valuable information for correcting errors within broken analytic elements.

Figure 1:
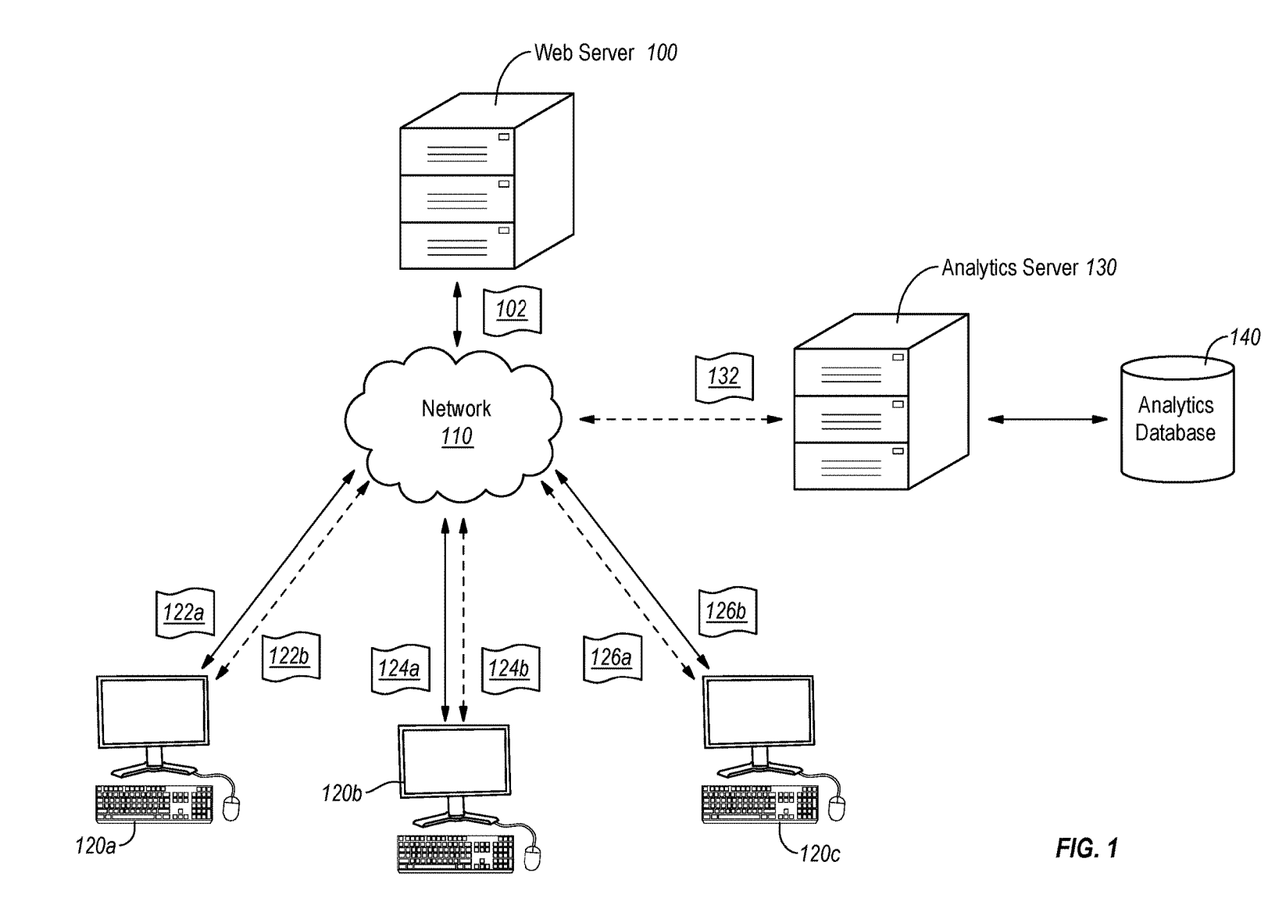
FIG. 1 illustrates a schematic of an embodiment of a network-based analytic element tracking system.

Turning now to the figures, FIG. 1 illustrates a schematic of an embodiment of a network-based analytic element tracking system. In particular, FIG. 1 depicts a group of end-user computers 120(a-c) in communication with a web server 100 through a network connection 110. One will understand that the depicted schematic is merely exemplary and that far more than three end-user computers 120(a-c) may be in communication with a web server 100 over a network connection 110. Additionally, in at least one embodiment, mobile computing devices instead of, or in addition to, the end-user computers 120(a-c) can request data from the web server 100 through the network 110.

In at least one embodiment, each end-user computer 120(a-c) requests data from web server 100. The requests 122a, 124a, 126a are generated from within web browsers, software applications, or by any other means within the end-user computers 120(a-c). In response to the request for data, the web server 110 transmits back to each respective end-user computer 120(a-c) the requested data 122b, 124b, 126b, along with one or more analytic elements 102.

In at least one embodiment, the one or more analytic elements 102 comprise HTML tags, such as a transparent pixel request, that requests data from a remote analytics server 130. When receiving the resulting request 132 from the end-user computers 120(a-c), the analytics server 130 logs the request, logs any associated variables, logs various analytic information about the request, and/or stores the information within an analytics database 140. While the above description is provided with respect to HTML tags, various disclosed embodiments are easily adapted to alternative analytic tracking methods. For example, some analytic methods do not rely upon tags that fire requests to external servers. Instead, some analytic methods gather all of the analytic data of interest within the web server 100. In such a case, the web server 100 stores the gathered analytics data within the analytics database 140, which may be local to the web server 100.

Accordingly, FIG. 1 depicts a schematic of an embodiment of a system for gathering analytic information. As depicted, the analytics server 130 gathers information from a large number of end-user computers 120(a-c) that are accessing a web server 100 (and accompanying website) of interest. Various different webpages hosted by the webserver 100 may include unique analytic elements that comprise various specific attributes such as, but not limited to, specific variables, specific names, specific paths, and other similar characteristics. Each of these specific attributes are predetermined by a website administrator in order to efficiently track the desired analytic information. For example, specific webpages may be associated with a language variable that can be stored within the analytics database 140. The language variable may be informative to the website administrator in identifying what language to generate new content in, what language advertisements should be provided in, and various other demographic specific determinations.

Figure 2:
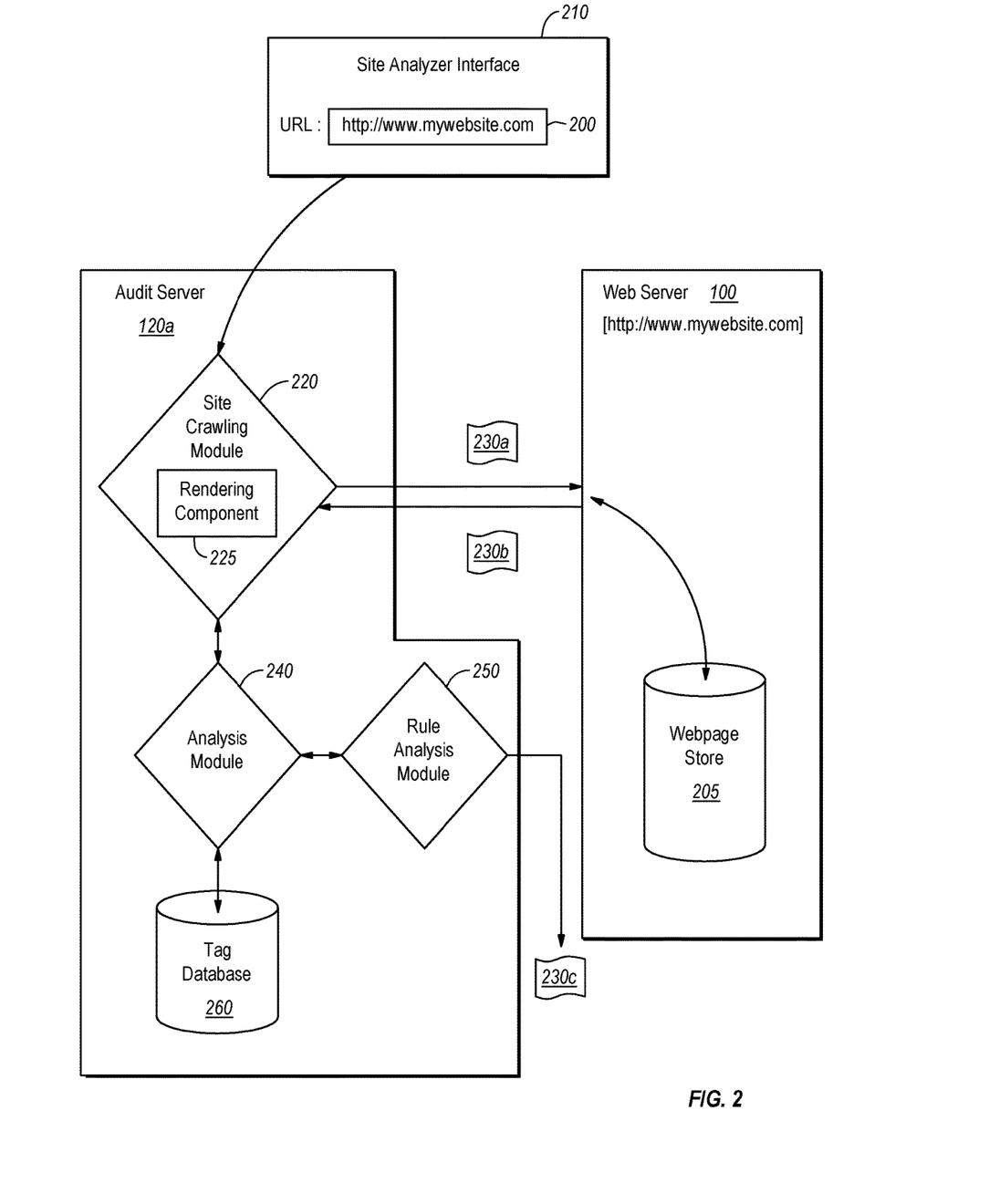
FIG. 2 illustrates a schematic of an embodiment of a network-based analytic element audit system.

FIG. 2 illustrates a schematic of a network-based analytic element audit system in accordance with embodiments of the present invention. The network-based analytic element audit system is executed within an analytics server 130, a web server 100, or within an end-user computer 120a that is configured to audit webservers. For simplicity and clarity, the examples provided herein relate to a network-based analytic element audit system executed by the end-user computer 120a, though other embodiments are not so limited. In at least one embodiment, the network-based analytic element audit system generates a site analyzer interface 210 at the end-user computer 120a (i.e., the analysis server). The audit server 120a receives from the site analyzer interface 210 a URL 200 to be analyzed. The audit server 120a comprises a site crawling module 220, an analysis module 240, a rule analysis module 250, and a tag database 260.

The audit server 120a accesses the provided URL 200 and communicates with the web server 100 that is associated with the URL 200. As depicted in FIG. 2, the web server 100 comprises a webpage store 205, where the actual website content is stored. For example, a webpage store 205 can store the source code of each webpage of a website. Additionally, a webpage store 205 can store multimedia content that is accessible through the webpages. In FIG. 2 and throughout the present application, web server 100 is depicted and described as being a unitary system. One will understand, however, that a web server 200 can be composed of multiple servers and multiple webpage stores 205. In at least one embodiment, the audit server 120a can access the webpage stores 205 on each of the servers that is associated with a particular webpage.

FIG. 2 shows that a user enters a URL 200 into a site analyzer interface 210. The site analyzer interface 210 then communicates the URL 200 to the audit server 120a. In this application, a URL 200 of "http://www.mywebsite.com" is used for exemplary purposes, but one will understand that any number of different URLs 200 can be entered into the site analyzer interface 210.

Once the audit server 120a has received the URL 200, the site crawling module 220 sends communication packets 230a to the web server 100 that is associated with the URL 200 and receives response communication packets 230b from the web server 100. In the depicted case, the site crawling module 220 accesses http://www.mywebsite.com. Specifically, the site crawling module 220 accesses the webpage store 205 that is associated with the web server 100. In at least one embodiment, the site crawling module 220 then crawls, using methods that are known in the art, through the entire website that is associated with URL 200.

In at least one embodiment, the site crawling module 220 includes a rendering component 225. The rendering component 225 renders rich or multimedia content contained in the packets 230b that are received from the web server 100. For example, the rendering component 225 can render a JAVA or FLASH portion of a webpage. Once rendered, the site crawling module 220 crawls the rendered portion of the webpage and identifies additional tags that were not otherwise visible.

In some cases, crawling a rendered webpage provides additional information than what would be available if only the source code is crawled. In particular, a particular webpage may contain multimedia content that contains attributes of interest that are only visible when the multimedia content is activated. For example, a video may fire a tag every thirty seconds while playing. The fired tags are used to track, in 30-second intervals, how much of a video was viewed by a user. In at least one embodiment, the rendering component 225 enables the site crawling module 220 to access these attributes of interest by rendering and activating at least a portion of the content that is embedded within a webpage that is stored within the webpage store 205.

As the site crawling module 220 crawls a website, the data 230b that is received from the webpage store 205 is sent to the analysis module 240. The analysis module 240 analyzes the webpage content to identify tags that are associated with each webpage of the website. Additionally, in at least one embodiment, the analysis module 240 determines the configurations of identified tags. For example, in at least one embodiment, the analysis module 240 determines that specific variables are associated with a particular tag.

Additionally, in at least one embodiment, the analysis module 240 also receives rendered information from the rendering component 225. The analysis module 240 analyzes the rendered information and identifies tags that are associated with a particular webpage. In particular, in at least one embodiment, the analysis module 240 identifies a tag as the tag is executed. For example, the analysis module 240 may identify that a particular piece of code requests information from either an unidentified server or from a server that is known to be associated with tag products.

Further, in at least one embodiment, the analysis module 240 identifies tags that are associated with rich content or multimedia content. For example, in some multimedia files, tags are configured to fire at particular points in the multimedia file—allowing the multimedia provider to identify how much of a particular file was viewed. In at least one embodiment, the analysis module 240 analyzes the entire multimedia file and identifies the tags and configurations of tags that are associated with the multimedia file.

In at least one embodiment, the analysis module 240 identifies the tags that are associated with each webpage by referencing a tag database 260. For example, the analysis module 240 compares the source code (or other attributes) of a particular website to all of the known tags within the tag database 260. For instance, the analysis module 240 may analyze a particular webpage that contains a specific-type of tag. The analysis module 240 compares the source code of the particular webpage to known tags that are contained within the tag database 260. The tag database 260 contains a signature of the specific-type of tag. Using the signature for the specific-type of tag that is stored in the tag database 260, the analysis module 240 identifies that the particular webpage contains the specific-type of tag.

In at least one embodiment, the signatures within the tag database 260 are actual copies of the known tags. In another embodiment, the signatures are based upon specific attributes of tags, such that the analysis module identifies a tag by identifying the specific attributes within a portion of the data 230*b* communicated from the site crawling module 220. For instance, the specific attributes may comprise a list of servers that the various tags communicate with, the type of data that the specific tags communicate with, or any other similar attribute that is associated with a tag.

Additionally, in at least one embodiment, the tag database 260 also contains characteristics that are associated with each tag. For example, the tag database 260 may contain information about the variables, if any, that are commonly associated with specific tags. In addition, the tag database 260 may also contain information about past versions of tags, such that the analysis module 240 can identify whether a particular tag is up-to-date. Further, in at least one embodiment, the tag database 260 may contain information that enables the analysis module 240 to identify undesirable tags (e.g., tags that are deemed unsecure, tags that steal user information, etc.).

Figure 3:
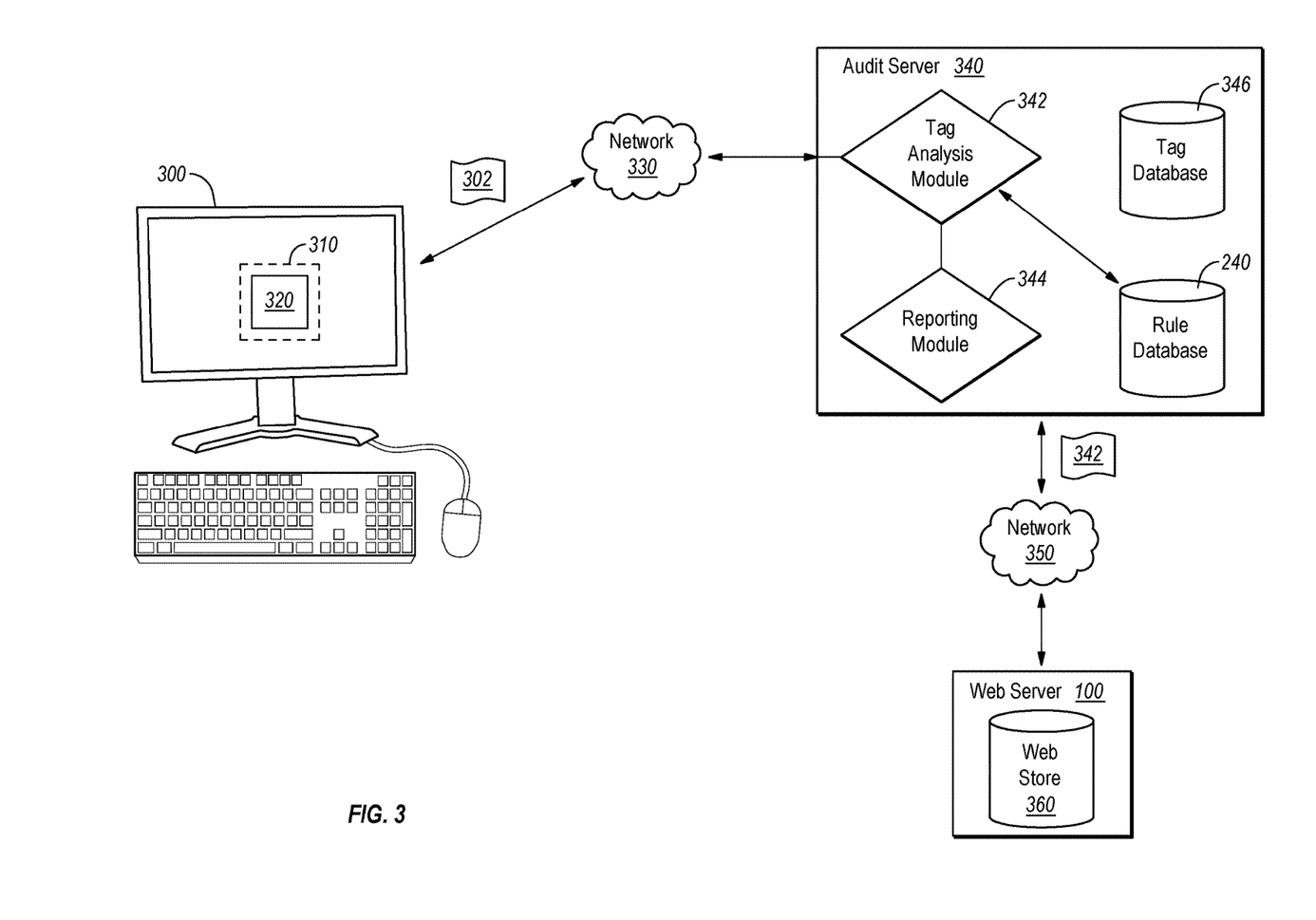
FIG. 3 illustrates a schematic of another embodiment of a network-based analytic element audit system.

FIG. 3 illustrates a schematic of another embodiment of a network-based analytic element tracking system. The schematic of FIG. 3 has been simplified to only show portions of interest. The network-based analytic element tracking system of FIG. 3 comprises a system for analyzing web-connected software applications. For example, in at least one embodiment, a mobile application 320 can be executed on an end-user computer 300 within a virtual machine 310. The virtual machine 310 may comprise a special environment capable of executing the network-connected software application. For example, the virtual machine 310 may be configured to replicate the operating environment of a particular type of mobile phone.

The network communications 302 generated by the mobile application 320 are routed through a network an audit server 340. In at least one embodiment, the audit server 340 functions as a network proxy for network communications 302 generated by the mobile application 320. While FIG. 3 depicts the end-user computer 300 and the mobile application 320 in communication with the audit server 340 through a network 330, in at least one embodiment, the audit server 340 is executed within the same end-user computer 300 as the virtual machine 310 and the mobile application 320.

When functioning as a proxy for the mobile application 320, the audit server 340 receives network communications 302 from the mobile application 320, analyzes the communications for analytic elements, and then forwards the communication 302 to its intended web server destination 100 through an external network 350. The web server 100 then gathers data from a web store 360 and communicates the data to the audit server 340, which in turn can communicate the data to the mobile application 320.

When analyzing the network communications 302, the audit server 340 utilizes a tag analysis module 342 that identifies analytic elements (e.g., tags) based upon signatures found in the network communications 302. The signatures are stored within a tag database 346. In at least one embodiment, the signatures comprise network destination addresses associated with particular types of tags and/or various network packet attributes associated with particular types of tags. Additionally, the tag analysis module 342 identifies variables and other characteristics associated with each identified analytic element.

Once analytic elements are identified and audited, disclosed embodiments access a dataset of information stored at the analytics database 140 (shown in FIG. 1). The dataset of information comprises all, or a portion, of the analytic data gathered by the analytics server 130. The dataset may also be specific to analytic elements associated with the web server 100. For instance, the analytics server 130 may receive analytic data from a large number of different customers. As such, the dataset may comprise all of the analytics data received by the analytics server 130 for the particular web server of interest 100, which may also comprise the web server 100 that was audited by audit server 120*a*.

In at least one embodiment, the audit server 120*a* receives the dataset from the analytics server 130. In at least one embodiment, the dataset is automatically communicated to the audit server 120*a* on a periodic basis. In contrast, in at least one embodiment, the audit server 120*a* communicates the dataset to the audit server 120*a* as the data is received. In such a case, the audit server 120*a* is receiving near real-time confirmation whether an analytic element is functioning or not.

The analysis module 240 within the audit server 120*a* then searches the dataset analytic element entries that correspond to each analytic element identified in the audit. For example, the analysis module 240 may have identified an analytic element that fired from a particular page, the identified analytic element may have comprised a specific path variable, language variable, and date stamp. The audit server 120*a* determines whether the identified analytic element is correctly accounted for in the dataset, not present within the dataset, or incorrectly accounted for in the dataset.

In the case that the analytic element is not present in the dataset or incorrectly accounted for in the dataset, the reporting module 344 generates a report 230*c* that indicates the error. For example, the reporting module 344 generates a report that indicates that the specific analytic element identified in the audit was not found in the dataset. Similarly, the reporting module 344 generates a report that the analytic element was incorrectly accounted in the dataset. For instance, the dataset may correctly state the language variable and time stamp, but neglect or incorrectly display the path associated with the analytic element.

Additionally, in at least one embodiment, the reporting module 344 provides trouble-shooting information relating to an incorrectly accounted for analytic element. For example, the audit server 120*a* can identify other analytic elements on the same page as the incorrectly accounted for analytic element. The audit server 120*a* can also determine if the other analytic elements were properly accounted for. In the case that the other analytic elements were properly accounted for, the reporting module 344 determines that the page was functioning correctly and that the problem is specific to the incorrectly accounted for analytic element.

One will understand that there are a variety of different diagnostic functions that the audit server 120*a* can perform on the dataset based upon the previously ran audit. Additionally, one will understand that the analysis of both the dataset and the audit information need not be performed at the audit server 120*a*. For example, in at least one embodiment, the analytics server 130 can perform the analysis based upon audit information received from the audit server 120*a*.

Accordingly, FIGS. 1-3 and the corresponding text illustrate or otherwise describe one or more components, modules, and/or mechanisms for auditing rules for network-based analytic elements. In particular, in at least one embodiment, the present invention can analyze a dataset of analytic information in view of a previously executed audit. Comparing the audit information to the dataset information can identify previously undetectable problems. One will appreciate that embodiments of the present invention can also be described in terms of flowcharts comprising one or more acts for accomplishing a particular result. For example, FIGS. 4 and 5 and the corresponding text describe acts in a method for auditing network-based analytic elements. The acts of FIGS. 4 and 5 are described below.

Figure 4:
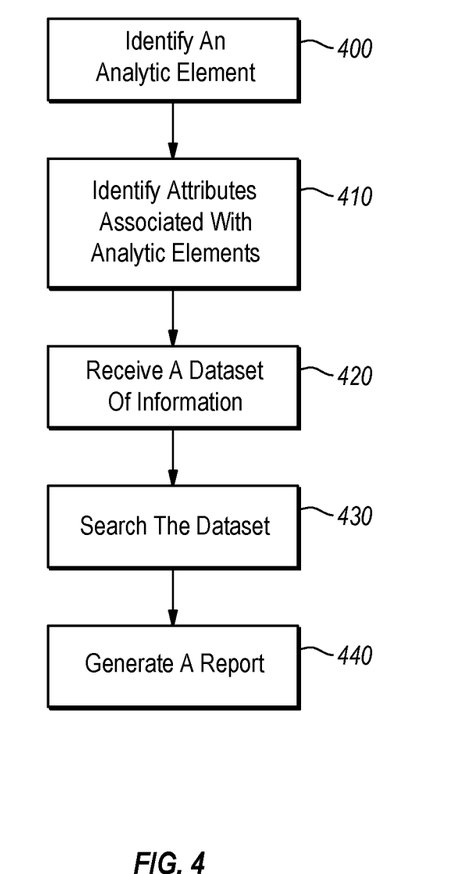
FIG. 4 illustrates a flow chart of a series of acts in an embodiment of a method for verifying proper configuration of analytic elements.
Figure 5:
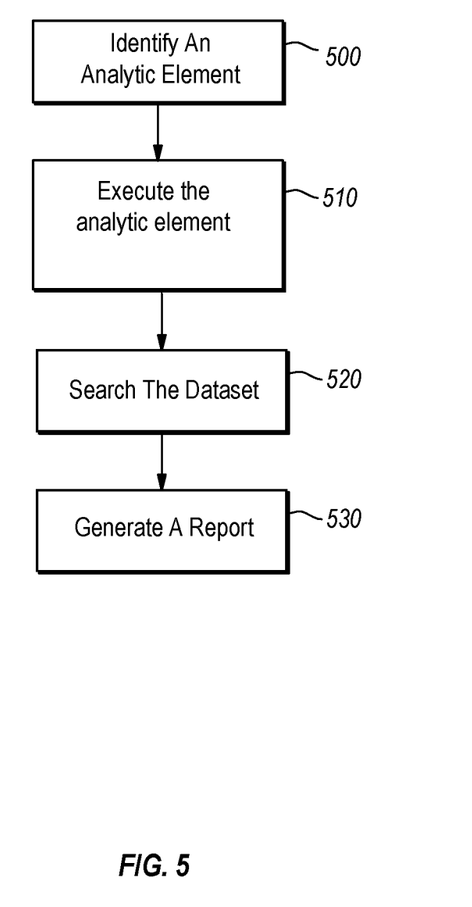
FIG. 5 illustrates a flow chart of a series of acts in another embodiment of a method for verifying proper configuration of analytic elements.

For example, FIG. 4 illustrates that a method for auditing network-based analytic elements can include an act 400 of identifying an analytic element. Act 400 can comprise identifying an analytic element associated with a network-connected software application, wherein the analytic element comprises a network request initiated by the computer system based upon content that is delivered to the computer system. For example, in FIG. 2 and the associated description, an analysis module 240 identifies tag signatures within the source code of a webpage.

Additionally, FIG. 4 illustrates that the method can include an act 410 of identifying attributes associated with analytic elements. Act 410 can comprise identifying one or more attributes associated with the analytic element, wherein at least one of the identified attributes comprises a destination of the network request associated with the analytic element. For example, in FIG. 2 and the associated description, an analysis module 240 identifies attributes associated with tag signatures. The attributes may include language type, path, identification information, and other similar analytic information.

FIG. 4 also shows that the method can include an act 420 of receiving a dataset of information. Act 420 can comprise receiving, at the computer system, a dataset of information for network-based analytic elements. The dataset can comprise information received by the destination of the network request associated with the analytic element. The dataset can also comprise information received from a plurality of different computer systems. For example, FIG. 1 depicts an analytics server 130 that receives analytic information from various end-user computers 120(*a-c*). The received analytic data is stored within a dataset in the analytics database 140. The analytics server 130 can communicate the data set to audit server 120*a*.

Further, FIG. 4 shows that the method can include an act 430 of searching the dataset. Act 430 can comprise searching the dataset for information relating to the one or more attributes associated with the analytic element, wherein the one or more attributes uniquely identify the analytic element. For example, FIG. 2 depicts an analysis module 240 that can search the dataset for analytic information that corresponds to analytic elements identified during an audit.

Further still, FIG. 4 shows that the method can include an act 440 of generating a report. Act 440 can comprise, when the one or more attributes associated with the analytic element are not found within the dataset, generating a report that the analytic element is not functioning properly. For example, the audit server 120*a* can generate a report 230*c* that indicates to a system administrator that a particular analytic element was not properly logged within the dataset.

As an additional example of FIG. 5 illustrates, a method for auditing network-based analytic elements includes an act 500 of identifying an analytic element. Act 500 comprises identifying an analytic element associated with a network-connected software application. For example, in FIG. 2 and the associated description, an analysis module 240 identifies tag signatures within the source code of a webpage.

Additionally, FIG. 5 illustrates that the method includes an act 510 of executing the analytic element. Act 510 comprises executing the analytic element such that the analytic element initiates a network communication with a remote server. For example, in FIG. 3 and the associated description, a virtual machine 310 executes a mobile application 320. The mobile application 320 is configured to communicate to a web server 100. The communications, however, are intercepted by an audit server 340 and then forwarded to the web server 100.

Further, FIG. 5 shows that the method can include an act 520 of searching the dataset. Act 520 comprises searching a dataset for information relating to the network communication from the analytic element, wherein the dataset comprises network communications received by a remote server. For example, FIG. 1 and the accompanying description describe the analysis module 240 receiving the data set from an analytics server. The analysis module 240 determines whether the identified analytic elements are properly represented within the data set.

Further still, FIG. 5 shows that the method can include an act 530 of generating a report. Act 530 comprises, when the one or more attributes associated with the analytic element are not found within the dataset, generating a report that the analytic element is not functioning properly. For example, the audit server 120*a* can generate a report 230*c* that indicates to a system administrator that a particular analytic element was not properly logged within the dataset.

Accordingly, embodiments of the present invention provide a system that can both audit the front-end of a web-connected software application and the back-end received analytic information data. As such, embodiments of the present invention provide significant technical improvements to the field of network communication management. For example, embodiments of the present invention provide a system administrator with information relating to analytic elements that would not otherwise be available.

Additionally, embodiments of the present invention increase the reliability of analytics information by ensuring that each analytic element is properly logged. One of skill in the art will understand that incorrectly-logged analytic elements may lead to lost data, incorrect data, and other such problems within the resulting analytics.

Accordingly, embodiments of the present invention comprise various different systems and methods for auditing analytic elements within a network-connected software application. In particular, embodiments of the present invention identify analytics elements within the source code and network communications of the network-connected software application. The identified analytics elements are audited for functionality and compliance with client provided guidelines.

Although the subject matter has been described in language specific to structural features, modules, and/or methodological acts, it is to be understood that the subject matter defined in the appended claims is not necessarily limited to the described features, modules, or acts described above, or the order of the acts described above. Rather, the described features, modules, and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources include processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer system for verifying proper configuration of analytic elements comprising:
    one or more processors;
    one or more storage devices having stored thereon computer-executable instructions that when executed by the one or more processors configure the computer system to perform at least the following:
        identify an analytic element associated with a network-connected software application, wherein the analytic element comprises a network request initiated by the computer system based upon content that is delivered to the computer system;
identify one or more attributes associated with the analytic element, wherein at least one of the identified attributes comprises a destination of the network request associated with the analytic element;
receive, at the computer system, a dataset of information for network-based analytic elements, wherein the dataset comprises information received by the destination of the network request associated with the analytic element;
search the dataset for information relating to the one or more attributes associated with the analytic element, wherein the one or more attributes uniquely identify the analytic element; and
when the one or more attributes associated with the analytic element are not found within the dataset, generate a report that the analytic element is not functioning properly, wherein generating a report that the analytic element is not functioning properly comprises:
determining that the one or more attributes associated with the analytic element are not found within the dataset;
identifying one or more other analytic elements that are associated with the analytic element; and
generating a report indicating whether one or more other attributes associated with the one or more other analytic elements are correctly represented within the dataset.

2. The computer system recited in claim 1, wherein the analytic element comprises an HTML tag embedded within a webpage.

3. The computer system recited in claim 1, wherein the content that is delivered to the computer system comprises a webpage.

4. The computer system recited in claim 1, wherein the one or more attributes comprises an identification of a type of analytic element.

5. The computer system recited in claim 1, wherein the one or more attributes comprises a variable associated with the analytic element.

6. The computer system recited in claim 1, wherein identifying one or more attributes associated with the analytic element comprises:
comparing source code associated with the analytic element with one or more signatures stored within a signature database; and
identifying a match between the source code and a particular signature, wherein the particular signature is associated with an identification of the analytic element.

7. The computer system recited in claim 1, wherein identifying one or more attributes associated with the analytic element comprises:
comparing a network request associated with the analytic element with one or more signatures stored within a signature database; and
identifying a match between the network request and a particular signature, wherein the particular signature is associated with an identification of the analytic element.

8. The computer system recited in claim 1, wherein searching the dataset for information relating to the one or more attributes comprises:
searching the dataset for an entry that matches a network request generated by the analytic element; and
comparing information in the entry with the identified one or more attributes associated with the analytic element.

9. A method performed at a computer system for verifying proper configuration of analytic elements comprising:
identifying an analytic element associated with a network-connected software application, wherein the analytic element comprises a network request initiated by the computer system based upon content that is delivered to the computer system;
identifying one or more attributes associated with the analytic element, wherein the one or more attributes uniquely identify the analytic element, and identifying one or more attributes associated with the analytic element comprises:
comparing a network request associated with the analytic element with one or more signatures stored within a signature database; and
identifying a match between the network request and a particular signature, wherein the particular signature is associated with an identification of the analytic element;
searching a dataset for information relating to the one or more attributes associated with the analytic element, wherein the dataset comprises network communications received by a remote server; and
when the one or more attributes associated with the analytic element are not found within the dataset, generating a report that the analytic element is not functioning properly.

10. The method in claim 9, wherein the analytic element comprises an HTML tag embedded within a webpage.

11. The method recited in claim 10, wherein generating a report that the analytic element is not functioning properly comprises:
determining that the one or more attributes associated with the HTML tag are not found within the dataset;
identifying one or more other HTML tags that are located on the same webpage as the HTML tag; and
generating a report indicating whether one or more other attributes associated with the one or more other HTML tags are correctly represented within the dataset.

12. The method recited in claim 9, wherein the one or more attributes comprise an identification of a type of analytic element.

13. The method recited in claim 9, wherein identifying one or more attributes associated with the analytic element comprises:
comparing source code associated with the analytic element with one or more signatures stored within a signature database; and
identifying a match between the source code and a particular signature, wherein the particular signature is associated with an identification of the analytic element.

14. The method recited in claim 9, wherein identifying the analytic element associated with the network-connected software application comprises:
activating a rich or multimedia file within the network-connected software application;
analyzing the rich or multimedia file while it is activated; and
identifying the analytic element, wherein the analytic element is presented at a particular point within the rich or multimedia file.

15. The method recited in claim 9, wherein identifying the analytic element associated with the network-connected software application comprises executing the network-connected software application within a virtual machine, wherein the virtual machine comprises an environment capable of executing the network-connected software application.

16. The method recited in claim 9, wherein searching the dataset for information relating to the one or more attributes comprises:
   searching the dataset for an entry that matches a network request generated by the analytic element; and
   comparing information in the entry with the identified one or more attributes associated with the analytic element.

17. The method recited in claim 9, wherein generating a report that the analytic element is not functioning properly comprises:
   determining that the one or more attributes associated with the analytic element are not found within the dataset;
   identifying one or more other analytic elements that are associated with the analytic element; and
   generating a report indicating whether one or more other attributes associated with the one or more other analytic elements are correctly represented within the dataset.

18. A computer system for verifying proper configuration of analytic elements comprising:
   one or more processors;
   one or more storage devices having stored thereon computer-executable instructions that when executed by the one or more processors configure the computer system to perform at least the following:
   identify an analytic element associated with a network-connected software application;
   execute the analytic element such that the analytic element initiates a network communication with a remote server;
   search a dataset for information relating to the network communication from the analytic element, wherein the dataset comprises network communications received by a remote server; and
   when the network communication generated by the analytic element is not found within the dataset, generate a report that the analytic element is not functioning properly, wherein generating a report that the analytic element is not functioning properly comprises:
      determining that the one or more attributes associated with the analytic element are not found within the dataset;
      identifying one or more other analytic elements that are associated with the analytic element; and
      generating a report indicating whether one or more other attributes associated with the one or more other analytic elements are correctly represented within the dataset.

* * * * *